Figure 1:
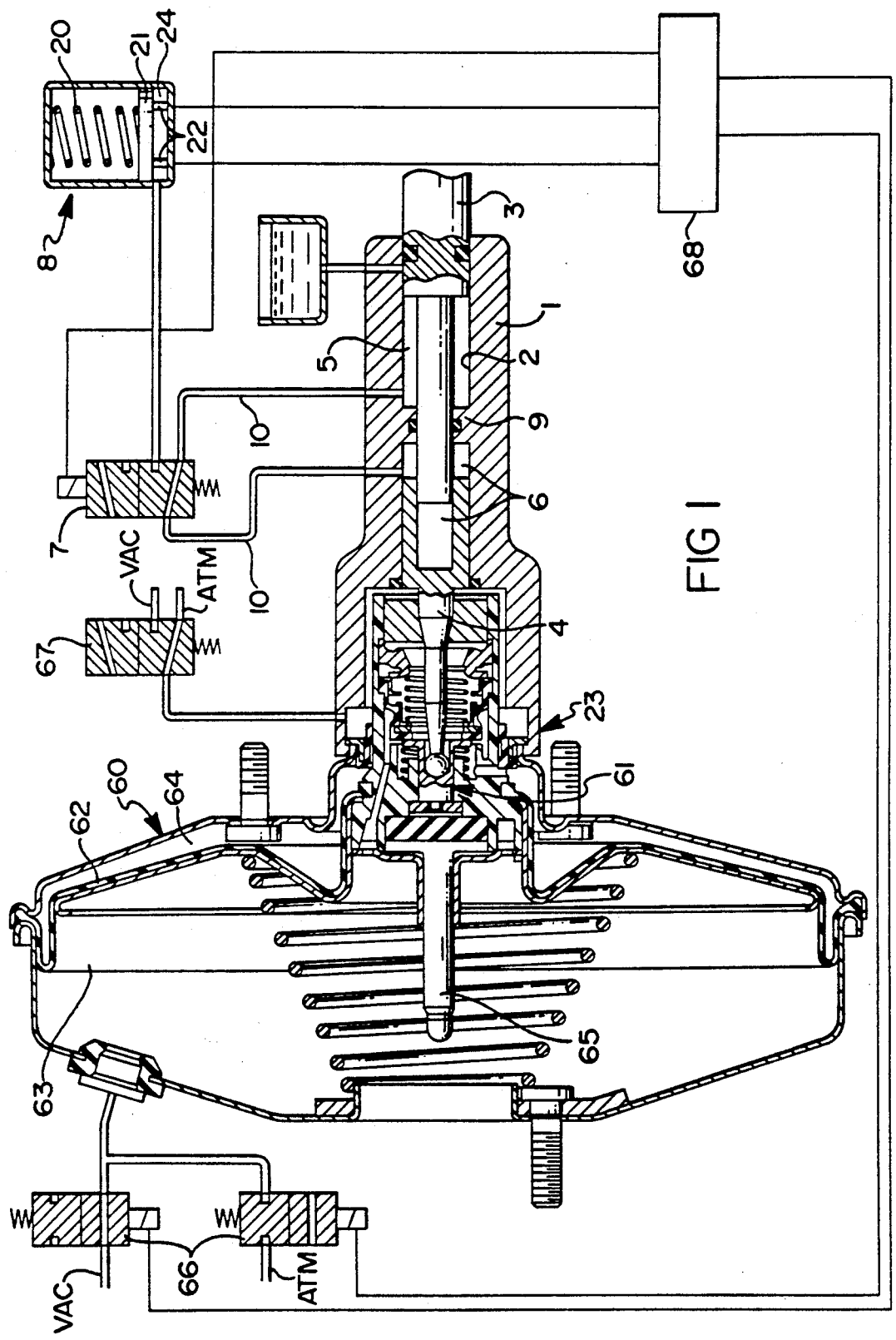

United States Patent [19]

Schiel et al.

[11] Patent Number: 5,096,268
[45] Date of Patent: Mar. 17, 1992

[54] HYDRAULIC COUPLING DEVICE, AS WELL AS BRAKE SYSTEM WITH SUCH A COUPLING

[75] Inventors: Lothar Schiel, Hofheim/Ts.; Ralf Jakobi, Liederbach; Hans-Juergen Beilfuss, Hofheim; Manfred Rueffer, Sulzbach; Harald Luetteke, Rosbach; Michael Vogt, Frankfurt am Main, all of Fed. Rep. of Germany

[73] Assignee: Alfred Teves GmbH, Frankfurt am Main, Fed. Rep. of Germany

[21] Appl. No.: 466,345

[22] PCT Filed: May 26, 1989

[86] PCT No.: PCT/EP89/00585

§ 371 Date: Mar. 28, 1990

§ 102(e) Date: Mar. 28, 1990

[87] PCT Pub. No.: WO90/00127

PCT Pub. Date: Jan. 11, 1990

[30] Foreign Application Priority Data

Jul. 1, 1988 [DE] Fed. Rep. of Germany ....... 3822262
Mar. 2, 1989 [DE] Fed. Rep. of Germany ....... 3906528

[51] Int. Cl.⁵ .................................................. b60t 8/44
[52] U.S. Cl. ........................... 303/114 R; 303/114 PN; 303/119 R; 60/568
[58] Field of Search ............. 303/113, 114, 119; 60/568, 569, 591; 91/460; 188/356, 357

[56] References Cited

U.S. PATENT DOCUMENTS

| 4,702,531 | 10/1987 | Kircher et al. | 303/114 |
| 4,703,978 | 11/1987 | Belart et al. | 188/356 X |
| 4,750,789 | 6/1988 | Belart et al. | 303/114 |
| 4,815,793 | 3/1989 | Reinartz et al. | 303/113 X |

FOREIGN PATENT DOCUMENTS

2120333 11/1983 United Kingdom ............... 303/114

Primary Examiner—Robert J. Oberleitner
Assistant Examiner—Josie A. Ballato
Attorney, Agent, or Firm—Robert P. Seitter; J. Gordon Lewis

[57] ABSTRACT

Hydraulic brake systems are known wherein, for the purpose of brake control, a counterforce is built up in the booster (60) for actuation of the master brake cylinder which results in unloading the master brake cylinder. What is disadvantageous in the known system is that this counterforce also resets the pedal (pedal piston 3) so that vehement pedal movements will result from the control action. Therefore, our present invention suggests to interpose a transmission device (3, 4, 5, 6, 7) between the pedal and the actuator (booster) enabling to decouple actuator and pedal.

28 Claims, 4 Drawing Sheets

HYDRAULIC COUPLING DEVICE, AS WELL AS BRAKE SYSTEM WITH SUCH A COUPLING

A brake system is described in German published patent application 33 17 629, the master brake cylinder of which is force-applied by a pedal-actuated booster. This booster comprises a valve which, in dependence upon the pedal force, develops an amount of pressure in the booster which loads the master brake cylinder in addition to the pedal force. Under the effect of the introduced pressure, a wall in the booster moves towards the master brake cylinder and thereby causes a decrease of the working chambers of the master brake cylinder. Further, the above published patent application describes the possibility of realising brake slip control, that means of avoiding locking of the wheels by reducing the pressure in the wheel brakes. This is effected in that a counterpressure is built up in the booster which results in unloading the master brake cylinder because it acts upon the wall in opposition to the pedal force. Valves are inserted into the brake lines which are open only when the pressure is to be reduced in the associated wheel brake cylinders. When the pressure has been reduced, the wheel can re-accelerate so that renewed braking pressure build-up becomes necessary after a while. To this end, the counterforce is 'withdrawn' from the booster, i.e. reduced, so that renewed build-up of pressure takes place in the master cylinder which is supplied further to the wheel brakes. Previously, the wheels had been able to sufficiently re-accelerate, and now they have to slow down again. The wall of the booster is constantly moving to and fro during a like control action and entrains the control valve. Since the pedal is coupled directly with the valve in previously known designs, the pedal performs a movement to and fro during the brake slip control action. This may even be desirable to a certain degree, since thus there is the possibility of informing the driver that a brake slip control action is performed. However, it has shown that these movements are too vigorous under certain circumstances and are felt as disturbing by the driver. From this derives the object to devise the coupling between the actuator, which actuates the master brake cylinder, and the pedal in such a fashion that the movements of the booster wall (of the actuator) are not transmitted onto the brake pedal. Moreover, the possibility must be afforded that the driver can influence the pressure in the wheel brakes by reducing the pedal force. This object is achieved by virtue of a hydraulic coupling as is described in claim 1.

The design becomes particularly simple when the pistons are guided in one common housing bore.

In a favourable manner, the pedal piston has a portion of smaller cross-section which extends through a wall in a sealed relationship thereto and which can be accommodated in an axial bore of the compensating piston for the purpose of guiding.

The wall isolates two chambers from each other which are interconnected for the hydraulic coupling. The chambers are filled with incompressible liquid so that, caused by the movement of the pedal piston, pressure fluid is displaced out of the blocking chamber into the compensating chamber and urges the actuator piston to advance.

For decoupling the pedal piston and the actuator piston, the blocking chamber is shut off hydraulically so that the pedal piston is no more actuatable in the actuating direction, and the compensating chamber is connected to a receiving chamber so that the actuator piston is freely movable.

The said receiving chamber can be a simple open supply reservoir, or a closed accumulator having a piston which is movable in opposition to a spring. The spring force generates a pressure in the accumulator which acts upon the actuator instead of the pedal force.

To this end, the accumulator piston is biassed by a spring against stops so that the spring force does not convert into a hydraulic pressure at first. When now pressure fluid is pressed out of the compensating chamber into the accumulator, the piston lifts from its stops, and the spring generates a pressure in the accumulator chamber which becomes effective in the compensating chamber as well. The preloading force of the spring is chosen such that the pressure in the compensating chamber exerts such a force on the actuator piston that the control valve assumes its maximum opening position. Further explanations will follow in the description of the Figures.

Another advantageous embodiment arranges for the pedal piston to have a surface which is adjacent to the compensating chamber.

As has been explained already, the hydraulic coupling device can be inserted in a particularly favourable manner in anti-lock brake systems wherein the booster (actuator) is exposed to a counterpressure for brake slip control, and wherein the force-transmitting wall of the booster is slid back in opposition to the pedal force. As soon as slip control is not necessary, the pedal piston is coupled hydraulically to the actuator piston so that the movement of the pedal is transmitted directly onto the actuator. As soon as brake slip control commences, the pedal piston and/or the blocking chamber is blocked hydraulically so that the pedal is not displaceable in the actuating direction. As the compensating chamber is communicating with the receiving chamber, the actuating piston is freely movable so that the movement of the booster wall is not transmitted onto the pedal piston.

To satisfy safety aspects, it can be expedient to movably support the housing of the force-transmitting device and to have it border on a blocking chamber. The latter is blocked hydraulically so that the housing is fixed in position. Should the control valve of the transmitting device get jammed and the pedal chamber remains hydraulically blocked thereby, the blocking chamber can be opened so that, for brake application, the housing is displaced under the effect of the pedal force, the pedal force being supported on the actuator piston via the housing. The inventive idea shall now be explained in more detail by way of several embodiments.

Figure 2:
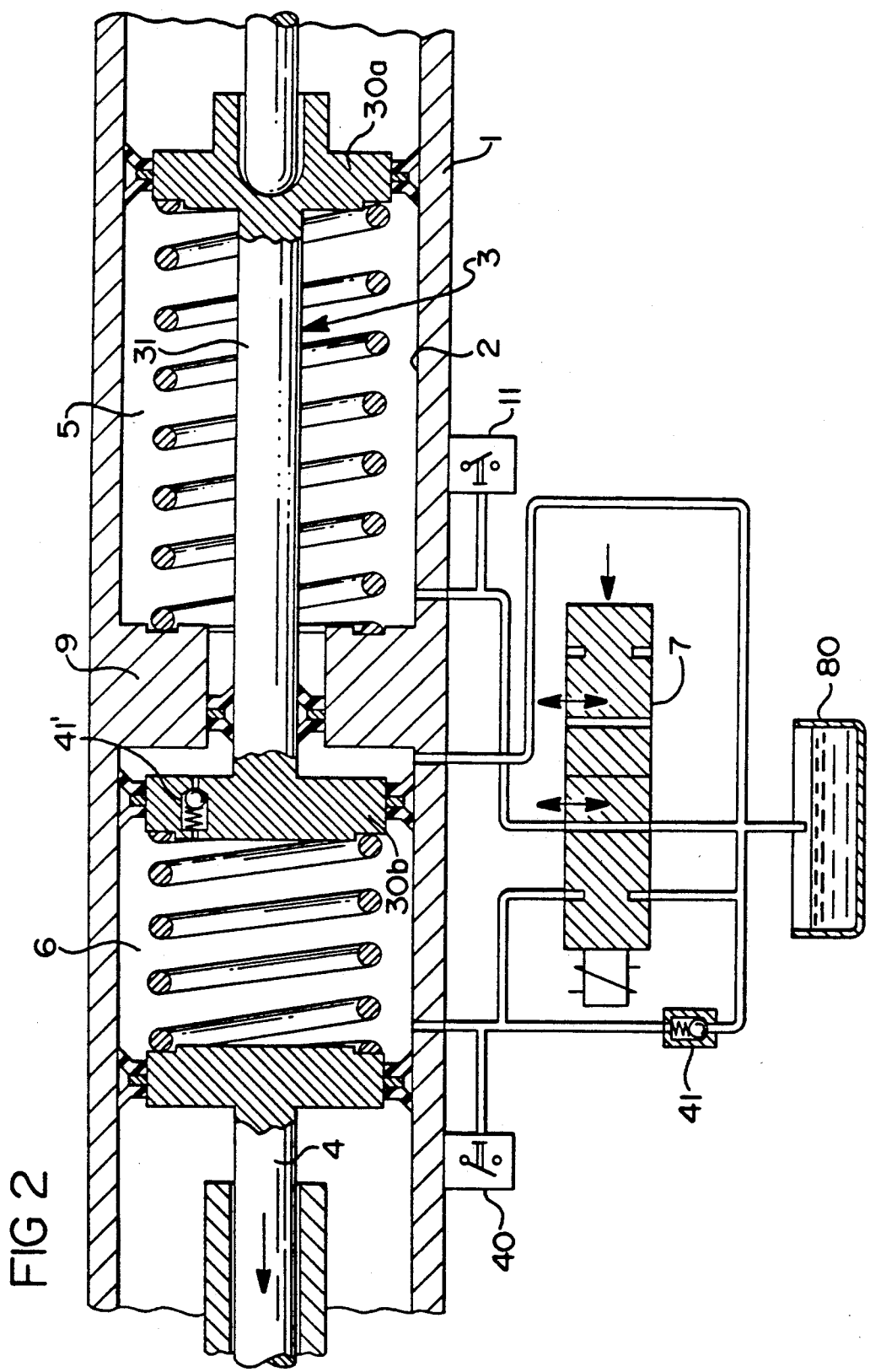
Figure 3:
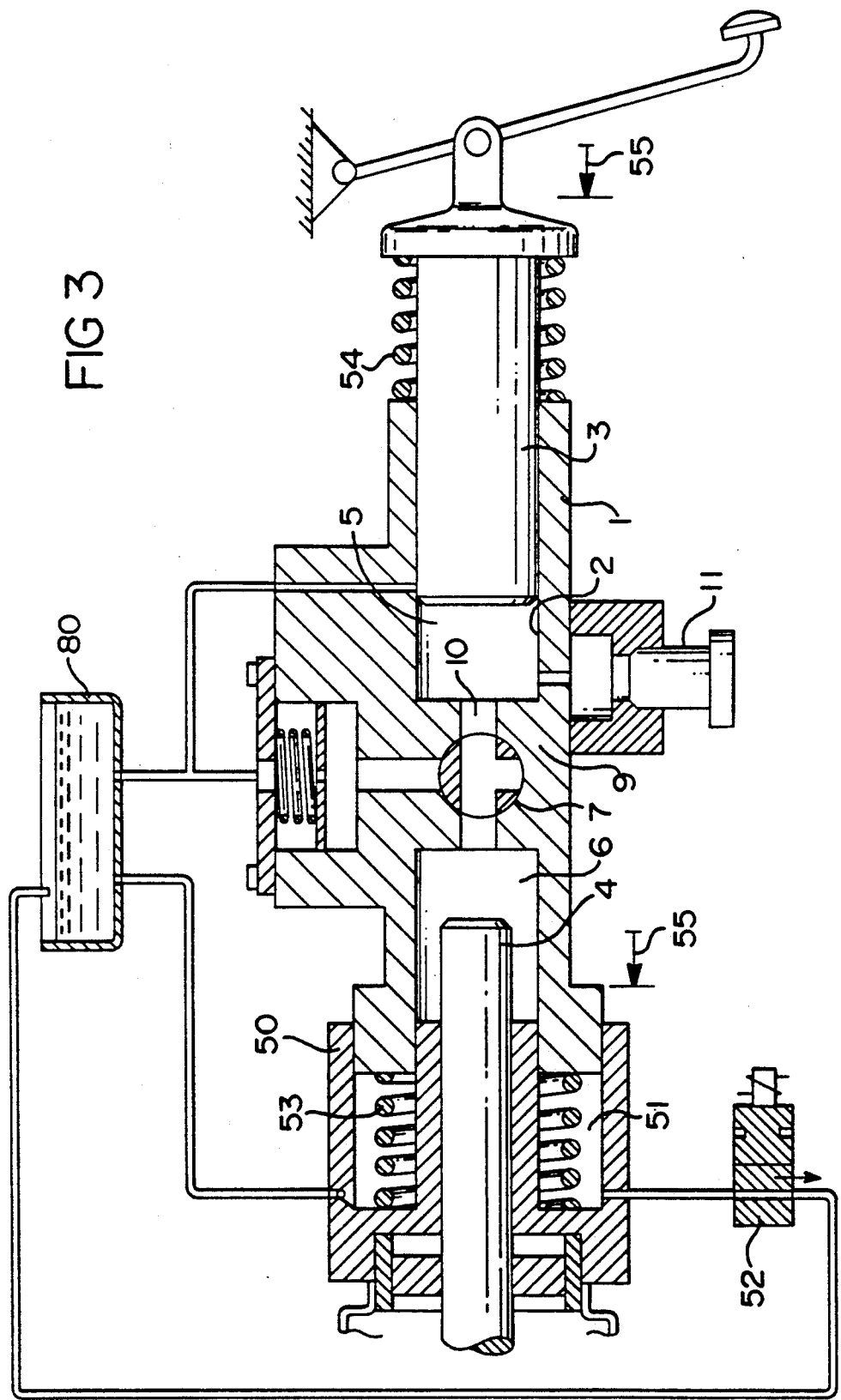
Figure 4:
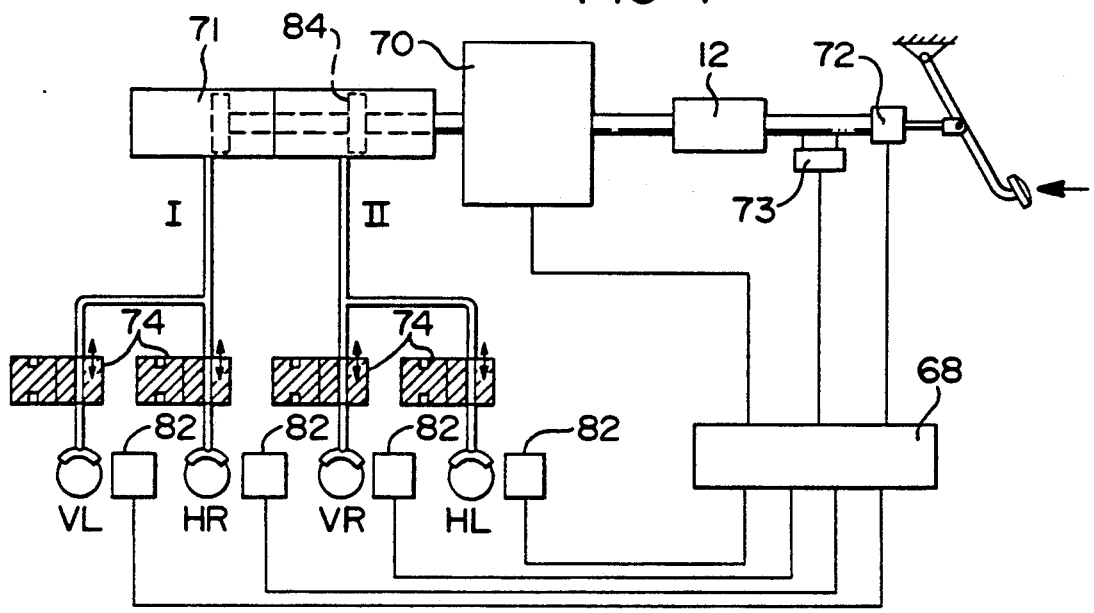
Figure 5:
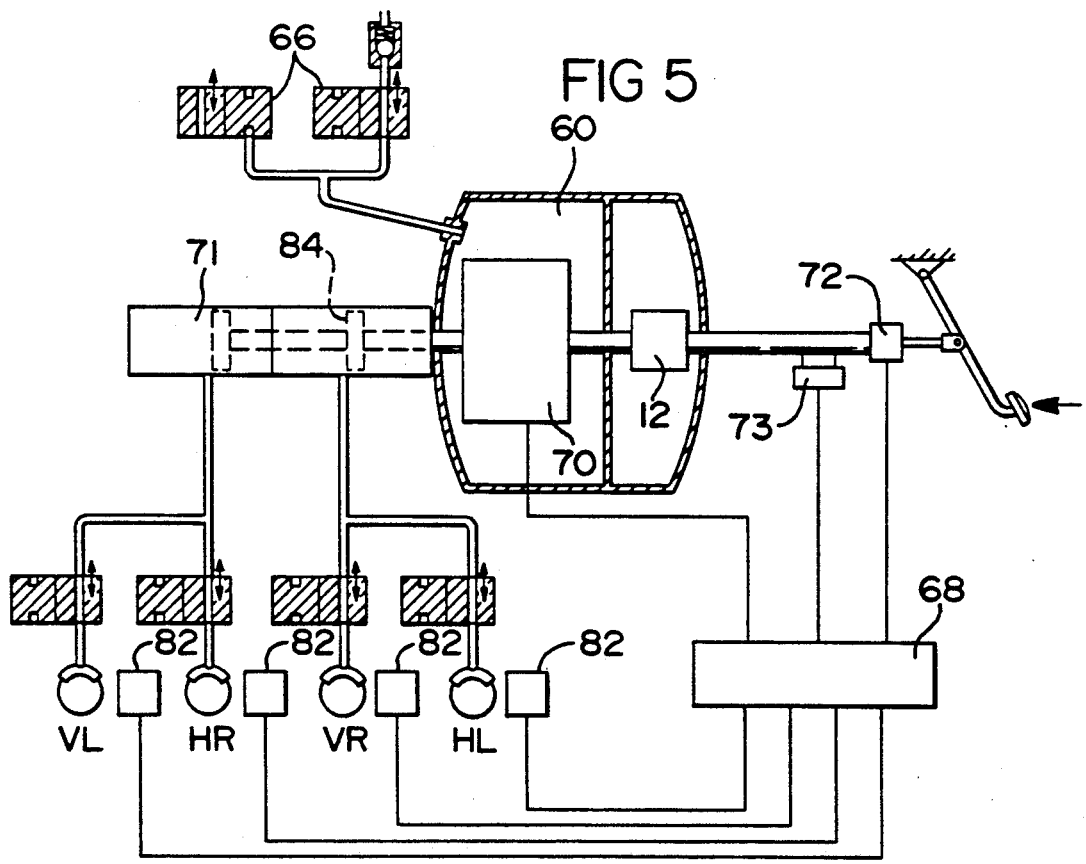

FIG. 1 through FIG. 3 show various embodiments of the transmitting device, while FIGS. 4 and 5 show brake systems including a force-transmitting and/or decoupling device.

Identical and/or identically acting component parts have been assigned like reference numerals in FIGS. 1 to 5. First, FIG. 1 shall be referred to.

The transmitting device is substantially composed of a housing 1 containing a longitudinal bore 2 in which two pistons are sealingly guided. The housing 1 itself is attached to the housing of a brake power booster 60 by way of a catch mechanism 23. The said pistons are the actuator piston 4, on the one hand, which is coupled to the push rod for operating the brake valve 61, and the pedal piston 3, on the other hand, which is coupled to a non-illustrated pedal. Said pedal piston 3 comprises a tapering portion which extends sealingly through a wall 9 and which is guided in an axial bore of the actuator piston 6. This wall 9 is represented by a seal in this embodiment. An annular chamber, the so-called blocking chamber 5, is arranged between the seal 9 and the main part of the piston 3 as well as the tapering portion of the piston 3 and the wall of the bore 2. The compensating chamber 6 is located between the wall 9 and the actuator piston 4. Blocking chamber 2 and compensating chamber 6 are interconnected via a connecting line 10 in which the control valve 7 is inserted. In the initial position of this valve, the chambers 5 and 6 are interconnected. In the switching position of the valve, the blocking chamber 5 is hydraulically blocked, and the compensating chamber 6 communicates with the accumulator chamber 24. In this embodiment, the accumulator 81 is substantially composed of a piston 21 which is loaded by a spring 20 and which confines the accumulator chamber 24. When pressure fluid is supplied into the accumulator chamber 24, the piston 21 displaces in opposition to the force of the spring 20. When the accumulator chamber 24 has its smallest volume, piston 21 abuts on two contact pins 22 and establishes a conductive connection between these contact pins. This way, it can be found out whether the accumulator is filled or empty.

In this embodiment, the actuator is represented by a brake power booster 60 which comprises a movable wall 62 which subdivides the housing of the brake power booster 60 into a modulator chamber 63 and a control chamber 64. Arranged on the wall 62 are a valve of known construction as well as a push rod 65 which acts upon the non-illustrated master cylinder and/or master cylinder piston. By means of two valves 66, the modulator chamber is connected to a vacuum source vac, in general this is the suction area of a combustion engine, and to the atmosphere atm, respectively. By means of another valve 67, via the intermediary of the control valve 61, the chamber 64 can now also be connected either to the vacuum source vac 67 or to the atmosphere atm. In the non-actuated position of the valve 61, the chambers 63 and 64 are interconnected. The vacuum of the vacuum source is prevailing in them. When the valve is actuated, first the chambers are separated from each other, then chamber 64 is connected to the atmosphere via the valve 67 in a dosed manner and proportional to pedal force.

The system operates according to the following scheme:

In the basic position, all parts assume the position shown, the valves are in their illustrated switching positions. To initiate a braking operation, the driver operates a pedal not shown, as a result whereof the piston 3 is displaced to the left according to the illustration. The pressure fluid in the chambers 5 and 6 acts as a hydraulic cushion so that the actuator piston 4, too, is displaced. The valve 61 is actuated in the fashion described hereinabove so that air flows into the chamber 64, and the wall 62 is shifted to the left under the effect of the air pressure. The tappet 65 acts upon a master brake cylinder, consequently, a pressure develops therein which is supplied further into the wheel brakes.

The rotational behaviour of the wheels is constantly monitored by means of sensors, whose signals are delivered to the electronic unit 68. Upon detection of an imminent locked condition of one of the wheels, first valve 7 is switched over. This has as a consequence that chamber 5 is shut off hydraulically and that piston 3 is not displaced further, not even when the pedal force is augmented. The compensating chamber 6 is now communicating with the reservoir 81 so that pressure fluid can be exchanged between the chamber 6 and the accumulator chamber 24. When pressure fluid is displaced out of chamber 6 into the accumulator chamber 21, pressure will develop in the chamber 6 and the accumulator chamber 22, respectively. This pressure, in lieu of the pedal force, is now acting upon the brake valve so that the latter assumes a position in which the connection between the chambers 63 and 64 is interrupted and the connection between the chamber 64 and the valve 67 is open (actuating position). The valves 66 are now switched over so that atmospheric pressure is applied to chamber 63 and the pressure of the vacuum source is applied to chamber 64. This has as a result that the wall 62 is shifted to the right according to the drawing, whereby the master brake cylinder is relieved from load. The actuation of the booster is now performed according to a predefined control algorithm irrespective of the pedal force.

As soon as the driver is no longer applying load on the pedal, piston 3 moves to the right. Pressure fluid out of the accumulator chamber 24 flows via the chamber 6 and the seal 9 acting as a non-return valve into the chamber 5. As soon as the piston 21 has reached the contact pins 22, valve 7 changes over so that now it assumes its basic position again. The brake force is again defined by the pedal force so that this way the respective maximum brake force can be determined by the driver. Thus, the possibility continues to exist of intervening in a control action, that means to interrupt it, by unloading the brake pedal.

Hence, the idea resides in actuating the booster in the control phase in such a way that the control valve 61 closes the connection between the chambers 63 and 64 and opens the connection between chamber 64 and valve 67. The chambers 63 and 64 can now be connected independently of each other to a vacuum source (vac) or to the atmosphere (atm) by means of the valves 66 and 67.

FIG. 2 depicts a slightly varied version of the force-transmitting device of FIG. 1. The piston 3 is composed of two piston parts 30a, 30b which are interconnected via a stem 31 which extends sealingly through a wall 9. The one part 30a is acted upon the pedal force, whilst part 30b lies opposite to the piston 4. The hydraulic connection of the chambers 5 and 6 is such that, in the basic position of valve 7, chamber 6 is shut off hydraulically and serves as a transmission chamber for the forces between the pedal and the actuator, and chamber 5 connects to the supply reservoir 8. Said chamber 5 is shut off hydraulically by change-over of valve 7 so that piston 3 can no more be moved in the actuating sense. Chamber 6 is connected to the unpressurized supply reservoir 80 so that there is free movability of the actuator piston 4. As an additional element, a pressure switch 11 is provided herein which monitors the pressure in the blocking chamber 5 and furnishes a reference value for the pedal force. When the driver takes his foot from the pedal, the pressure in the blocking chamber 5 will decrease, thus allowing a braking pressure control operation to be interrupted.

Another pressure switch 40 monitors the pressure in chamber 6. Said chamber 6 is moreover connected to the supply reservoir via a non-return valve 41 and 41', respectively. This non-return valve can be housed in the partial piston 30b, for instance.

The embodiment according to FIG. 2 operates essentially according to the same scheme like the embodiment of FIG. 1.

The control valve 7 assumes the illustrated position for force transmission. Chamber 6 is shut off hydraulically, chamber 5 is in communication with the supply reservoir. Pressure fluid is displaced out of chamber 5 into the pressure-fluid reservoir 80 upon movement of the piston 3. The pressure fluid in chamber 6 acts as a hydraulic pressure cushion and transmits the movement of piston 3 onto piston 4.

The valve 7 is changed over in a brake slip control operation. Chamber 5 is shut off hydraulically so that piston 3 is fixed. Piston 4 is now freely movable, since pressure fluid is displaced out of chamber 6 into the supply reservoir upon a corresponding movement of the piston 4.

In order to allow a supply reservoir 80 instead of an accumulator 81 to connect to the compensating chamber 6, the ports of valve 61 must be designed somewhat differently. The port which terminates into chamber 63 according to FIG. 1 must extend to an outside port on the housing of booster 60, e.g. via a hose line. This port can then connect to either the vacuum source or the atmosphere by virtue of a valve, the function of which corresponds to valve 67. The actuator piston 4 is not loaded in a control action so that chamber 64 can be connected either to the vacuum source or to the atmosphere via the port described above. As disclosed in FIG. 2, chamber 63 is likewise connectible via the valves 66 either to the vacuum source or to the atmosphere.

The braking pressure can be continuously influenced by the driver due to the fact that chamber 5 communicates via a non-return valve either to the master brake cylinder or to the wheel brakes. The pressure in the master brake cylinder and/or in the wheel brakes will then not be permitted to be in excess of the pressure which is built up in chamber 5 by the driver.

Another embodiment is depicted in FIG. 3. The control valve 7 is herein designed as a slide valve which is accommodated in the wall between chamber 5 and chamber 6. In the illustrated initial position, there is a pressure-fluid connection between the two mentioned chambers via the channel 10 in the wall 9. Chamber 5 is shut off hydraulically when the rotary slide valve is turned by 90 degrees. Chamber 6 is connected to the supply reservoir 80.

Another special characteristic in this embodiment resides in the provision of a blocking chamber 51 which is designed in an intermediate member 50. Chamber 51 is confined by the housing 1 of the transmitting device and connects to the supply reservoir 80 via a closing valve 52. This valve is normally open. When hydraulic force transmission takes place between the pistons 3 and 4, then housing 1 is not moved, since the forces which are transmitted via the spring 54 from the pedal onto the housing are compensated by the spring 53. As explained, chamber 5 is shut off hydraulically during a brake slip control operation so that the pressure forces would be transmitted onto the housing. A movement of the housing resulting therefrom is prevented by the valve 52 switching over so that chamber 51 is shut off hydraulically.

Should the case occur that valve 7 is jammed so that chamber 5 remains hydraulically closed, an actuation of the brake would be no more possible according to the preceding embodiments, since the pedal forces cannot be transmitted onto the actuator piston. This problem is solved in the embodiment according to FIG. 3. This is because if this case occurs without a slip control action being planned at the same time, valve 52 will open, whereby the housing is displaced under the influence of the pedal force and moves into abutment on the actuator rod 4. This way, a transmission of the pedal forces onto the actuator and thus onto the master brake cylinder is possible.

The stops 55 bring about a defined initial position of the housing 1.

This embodiment, too, provides for a pressure sensor 11 which monitors the pressure in the chamber so that the brake slip control operation can be interrupted as soon as the driver retracts his foot from the pedal.

An improvement not shown resides in that another closing valve which is open in its initial position is inserted into the channel 10 between the rotary slide and the blocking chamber 5. Upon commencement of a brake slip control operation, first this additional valve is closed before the control valve 7 is actuated. At the end of the brake slip control operation, the valves are reset in the reverse order.

FIGS. 4 and 5 illustrate the mounting of a force-transmitting device into a brake system. This brake system is composed of a master brake cylinder 71 as well as an actuator 70, which is an electromagnetic control member in this instance. Disposed between the symbolically illustrated pedal and the actuator is the decoupling device 12 as described e.g. in FIGS. 1 to 3. The pedal forces are recorded by means of a force sensor 72, the pedal travel is recorded by means of a travel sensor 73. Connected to the master brake cylinder 71 via two brake circuits I and II are the wheel brakes which are referred to by their place on the vehicle (v=front, h=rear, l=left, r=right). Each wheel brake is furnished with a valve 74. A braking operation is initiated by application of the pedal, whereby the pedal forces are transmitted directly onto the master brake cylinder. The pedal forces are boosted, for instance by a pneumatic booster 60 (FIG. 5) or by the electromagnetic means 70 which supplies a force component corresponding to the pedal force and/or the displacement travel of the pedal. At the onset of the brake slip control operation, the transmitting device 12 is activated, the pedal being decoupled from the actuator 70 as a result. This actuator is now transmitting forces onto the master cylinder 71 corresponding to the algorithms of brake slip control and in consideration of the pedal forces.

We claim:

1. A hydraulic coupling for transmitting longitudinal force from a brake pedal to an actuator for actuating a master brake cylinder of a brake system, said hydraulic coupling comprising:

a housing;

a pedal piston connectable to said brake pedal and disposed in the housing defining a blocking chamber within the housing;

an actuator piston connectable to said actuator and disposed in the housing defining a compensating chamber within the housing;

a hydraulic fluid receiving chamber external of the housing; and a valve operable to hydraulically isolate the blocking chamber while connecting the compensating chamber to the receiving chamber.

2. The hydraulic coupling of claim 1 further comprising said housing having one common bore for guiding the pedal piston and the actuator piston.

3. The hydraulic coupling of claim 1 further comprising said actuator piston having an axial bore and said pedal piston having a narrowed portion engageable within the axial bore of the actuator piston.

4. The hydraulic coupling of claim 3 further comprising said housing having a wall with a bore extending therethrough such that said narrowed portion of said pedal piston extends through the bore in a sealed relationship to the wall.

5. The hydraulic coupling of claim 1 wherein said blocking chamber is interconnected with said compensating chamber for force transmission.

6. The hydraulic coupling of claim 1 wherein said blocking chamber is isolated hydraulically and said compensating chamber is connected to said receiving chamber for decoupling said pedal piston from said actuator piston.

7. The hydraulic coupling of claim 1 further comprising a three-way/two-position directional control valve movable between a first position wherein said blocking chamber is interconnected with said compensating chamber for force transmission and a second position wherein said blocking chamber is isolated hydraulically while said compensating chamber is connected to said receiving chamber for decoupling said pedal piston from said actuator piston.

8. The hydraulic coupling of claim 1 further comprising catch means for snap fitting said housing on said actuator.

9. The hydraulic coupling of claim 1 wherein said receiving chamber comprises an accumulator.

10. The hydraulic coupling of claim 9 further comprising sensor means for sensing a fluid level within said accumulator.

11. The hydraulic coupling of claim 9 further comprising a movable wall disposed within said accumulator, a spring biasing said movable wall within said accumulator, and two switching contacts spaced from one another facing the movable wall such that the movable wall forms a bridge between said contacts in a normal spring biased rest position.

12. The hydraulic coupling of claim 1 further comprising a wall isolating said blocking chamber from said compensating chamber, the wall having a pressure fluid channel for interconnecting the chambers, and a three-way/two-position directional control valve disposed within the channel for interrupting the connection between said blocking chamber and said compensating chamber.

13. The hydraulic coupling of claim 12 wherein said three-way/two-position directional control valve comprises a rotary slide valve.

14. The hydraulic coupling of claim 1 further comprising said pedal piston having a first part adjacent said compensating chamber.

15. The hydraulic coupling of claim 14 further comprising said pedal piston having a second part interconnected with said first part by an intermediate stem, said housing having a wall disposed between said first and second parts of said pedal piston, the wall having a bore allowing passage of the intermediate stem in a fluid tight manner, the second part of said pedal piston disposed between said pedal and the first part, the second part of the pedal piston defining said blocking chamber in an annular chamber between the wall and the second part of said pedal piston, and the first part of said pedal piston forming an end boundary of said compensating chamber.

16. The hydraulic coupling of claim 15 wherein said compensating chamber is connected to said receiving chamber while said blocking chamber is hydraulically isolated.

17. The hydraulic coupling of claim 15 wherein said blocking chamber is connected to said receiving chamber while said compensating chamber is hydraulically isolated.

18. The hydraulic coupling of claim 14 further comprising first pressure sensor means for monitoring said blocking chamber and second pressure sensor means for monitoring said compensating chamber.

19. The hydraulic coupling of claim 1 further comprising said actuator having a connecting portion and said housing sealingly guided in the connecting portion of said actuator with said blocking chamber disposed adjacent said housing being hydraulically isolatable.

20. The hydraulic coupling of claim 19 further comprising a stop in abutment with said housing, and spring means for normally retaining said housing in abutment with the stop, wherein said blocking chamber has maximum volume when said housing is in abutment with the stop.

21. A hydraulic brake system comprising:
means for generating slip control signals;
a master brake cylinder;
an actuator acting on the master brake cylinder such that the master brake cylinder can be loaded and unloaded in dependence on the slip control signals by actuating the actuator;
a brake pedal;
a hydraulic coupling disposed between the actuator and the brake pedal for transmitting longitudinal force from the brake pedal to the actuator for actuating the master brake cylinder, the hydraulic coupling including:
a housing;
a pedal piston connectable to said brake pedal and disposed in the housing defining a blocking chamber within the housing;
an actuator piston connectable to said actuator and disposed in the housing defining a compensating chamber within the housing;
a hydraulic fluid receiving chamber external to the housing; and
a valve operable to hydraulically isolate the blocking chamber while connecting the compensating chamber to the receiving chamber.

22. The hydraulic brake system of claim 21 wherein said actuator comprises a pneumatic vacuum booster.

23. The hydraulic brake system of claim 21 wherein said actuator comprises an electromagnetically actuated control member.

24. An anti-lock brake system comprising:
a plurality of wheel brakes;
a closable valve associated with each wheel brake;
a master brake cylinder having at least one working piston, the master brake cylinder connected to the wheel brakes through each associated closable valve;
a booster inserted in front of the master brake cylinder and including a movable wall supported on at least one working piston of the master brake cylinder, the movable wall separating two chambers, the two chambers selectively and independently connectable to a pressure source and to a vacuum source for loading and unloading the master cylinder;

a control valve for introducing pressure fluid from the pressure source into one of the two chambers, said one of the two chambers being disposed on a side of the movable wall remote from the master cylinder, the control valve interconnecting the two chambers in an initial position;

a housing having a compensating chamber and a blocking chamber;

an actuator piston disposed in the housing for actuating the control valve, the actuator piston defining a boundary surface of the compensating chamber;

a pedal-operated pedal piston disposed within the housing defining a boundary surface of the blocking chamber; and an accumulator having an accumulator chamber confined by a spring-loaded piston;

wherein the compensating chamber selectively communicates with the blocking chamber and, for a brake slip control operation, the compensating chamber selectively communicates with the accumulator chamber.

25. The anti-lock brake system of claim 24 further comprising a stop within the accumulator and a spring biasing the spring-loaded piston against the stop.

26. The anti-lock brake system of claim 25 wherein the spring is selected for a bias in excess of a maximum boosting power for the booster.

27. The anti-lock brake system of claim 24 wherein the pressure source comprises atmosphere and wherein the pressure drain comprises a vacuum source.

28. The anti-lock brake system of claim 24 wherein the control valve is disposed in the movable wall of the booster.

* * * * *